(12) United States Patent
Ciocci et al.

(10) Patent No.: US 9,176,790 B2
(45) Date of Patent: Nov. 3, 2015

(54) LOADING AND REBALANCING OF DISTRIBUTION GROUP SERVERS

(75) Inventors: Louis J Ciocci, Mahwah, NJ (US); Ara Seferian, River Vale, NJ (US); Adam Hanson, Warwick, NY (US)

(73) Assignee: Creston Electronics, INC., Rockleigh, NJ (US)

( * ) Notice: Subject to any disclaimer, the term of this patent is extended or adjusted under 35 U.S.C. 154(b) by 662 days.

(21) Appl. No.: 13/460,014

(22) Filed: Apr. 30, 2012

(65) Prior Publication Data

US 2013/0290540 A1    Oct. 31, 2013

(51) Int. Cl.
| G06F 9/50 | (2006.01) |
| G06F 9/52 | (2006.01) |
| H04L 29/08 | (2006.01) |
| G06Q 10/06 | (2012.01) |

(52) U.S. Cl.
CPC ............... *G06F 9/5083* (2013.01); *G06F 9/52* (2013.01); *G06Q 10/0631* (2013.01); *H04L 67/1008* (2013.01)

(58) Field of Classification Search
CPC ..... H04L 67/32; H04L 43/10; H04L 67/1008; G06F 9/52
USPC ................................................. 709/206, 219
See application file for complete search history.

(56) References Cited

U.S. PATENT DOCUMENTS

| 5,781,731 A | 7/1998 | Koreeda et al. |
| 6,067,545 A * | 5/2000 | Wolff .................. H04L 67/1008 1/1 |
| 6,101,508 A * | 8/2000 | Wolff ........................ G06F 9/52 707/999.001 |
| 6,185,601 B1 | 2/2001 | Wolff |
| 6,269,375 B1 | 7/2001 | Ruddy et al. |
| 7,620,027 B2 * | 11/2009 | Igarashi et al. ............... 370/341 |
| 7,865,596 B2 * | 1/2011 | Grosner et al. ............... 709/226 |
| 7,979,460 B2 | 7/2011 | Harris |
| 8,065,175 B1 * | 11/2011 | Lewis .......................... 705/7.19 |
| 8,095,536 B1 * | 1/2012 | Kelly et al. ................... 707/723 |
| 8,134,916 B2 | 3/2012 | Achlioptas et al. |
| 8,432,869 B2 * | 4/2013 | Igarashi et al. ............... 370/331 |
| 8,706,718 B2 * | 4/2014 | Gerstner et al. ............. 707/723 |
| 8,949,471 B2 * | 2/2015 | Hall et al. ..................... 709/250 |

* cited by examiner

*Primary Examiner* — Kristie Shingles
(74) *Attorney, Agent, or Firm* — Crestron Electronics, Inc

(57) ABSTRACT

The invention relates to an architecture that facilitates assigning and load balancing of rooms assigned to at least one server. In an illustrative embodiment, the method comprises retrieving a current number of assigned rooms to each server, retrieving a current number of unassigned rooms, determining a current server weight for each of at least a subset of the at least one server within the at least two distribution groups, determining a total server weight, and calculating the number of rooms to load for at least a given one of the at least one server based at least in part on the number of unassigned rooms, total server weight, and current server weight of the given one of the at least one server.

33 Claims, 5 Drawing Sheets

LOADING AND REBALANCING OF DISTRIBUTION GROUP SERVERS

BACKGROUND OF THE INVENTION

1. Technical Field

The present invention relates to an architecture that facilitates assigning and load balancing of rooms assigned to a plurality of servers in a plurality of distribution groups. More specifically, the present invention relates to a system where load balancing is maintained for servers in each network distribution that handles scheduling and management of rooms in an organization.

2. Background Art

Global communications networks such as the Internet are now ubiquitous with an increasingly large number of private and corporate users dependent on such networks for scheduling and managing shared conference rooms and other corporate resources. As communications improves, more data can be expected to traverse the global communications data backbone between sources and destinations (typically, server hosts) placing increasing demands on those entities that handle and store data. In particular, demands for conference room management have become more complex. For example, conference room management does not only involve reserving a particular conference room for a given time, but also involve other corporate assets that are associated with a conference room such as televisions, projectors, and heating, ventilation, and air conditioning devices and systems. Conference rooms in various organizations are booked by one or more users for meetings and teleconferences. Conventionally, booking and scheduling of a conference room in an organization is carried out using Personal Information Managers including Microsoft Outlook®, Infoselect®, Meeting Maker®, etc. Further, a user typically checks availability of conference rooms using a personal information manager application on his personal computer or mobile device for reserving a conference room for a stipulated day and duration as per requirement.

Generally, the servers that handle the conference room management for each network distribution are not distributed evenly. For example, if one distribution group does not function properly, another distribution group having multiple servers may handle requests that are normally delegated to the failed distribution group. As a result, the loads being handled by the remaining servers in the various distribution groups are not evenly distributed. Additionally, one server may be responsible to handle more loads than another server when the overloaded server may have less capability than the less-loaded server. The servers are, therefore, not optimally utilized. Furthermore, in a network distribution, there may be an extra server that acts as a backup server. This is a waste of resources since the backup server is not actively involved in handling requests except for when there is a failed server.

In light of the abovementioned disadvantages, there is a need for a system, method and software that can efficiently assign and rebalance multiple servers in a plurality of network distribution.

SUMMARY OF THE INVENTION

It is to be understood that both the general and detailed descriptions that follow are exemplary and explanatory only and are not restrictive of the invention.

DISCLOSURE OF INVENTION

Principles of the invention provide systems, methods, and software that facilitate assigning and load balancing of a plurality of servers in a plurality of distribution groups. For example, in a first aspect of the invention, a method retrieves a current number of rooms assigned to each server, retrieves a current number of unassigned rooms, determines a current server weight for each of at least a subset of the at least one server, determines a total server weight, and calculates the number of rooms to load for at least a given one of the at least one server based at least in part on the number of unassigned rooms, total server weight, and current server weight of the given one of the at least one server.

In a second aspect of the invention a system comprises a distribution group having at least one server and an information handling system in communications with the at least one server. The information handling system comprises at least one processor, a memory being operably associated with the at least one processor, and at least one storage device being operably associated with the memory and the at least one processor. The data storage device includes a software engine and data storage. The information handling system further comprises at least one communication interface being operably associated with the at least one processor and memory. The at least one communication interface is configured to enable communications between the information handling system and at least a given one of the at least one server. The information handling system is configured to retrieve a current number of rooms assigned to each server, retrieve a current number of unassigned rooms, determine a current server weight for each of at least a subset of the at least one server, determine a total server weight, and calculate the number of rooms to load for at least a given one of the at least one server based at least in part on the number of unassigned rooms, total server weight, and current server weight of the given one of the at least one server.

In a third aspect of the invention, a computer program product for assigning and rebalancing of rooms having at least one server. The computer program product comprises a computer readable storage medium having computer readable program code embodied therewith. The computer readable program code comprises computer readable program code configured to retrieve a current number of rooms assigned to each server, retrieve a current number of unassigned rooms, determine a current server weight for each of at least a subset of the at least one server, determine a total server weight, and calculate the number of rooms to load for at least a given one of the at least one server based at least in part on the number of unassigned rooms, total server weight, and current server weight of the given one of the at least one server.

The present invention seeks to overcome or at least ameliorate one or more of several problems, including but not limited to: servers that are not utilized efficiently in a plurality of distribution groups.

BRIEF DESCRIPTION OF DRAWINGS

Brief Description of the Several Views of the Drawings

Figure 1:
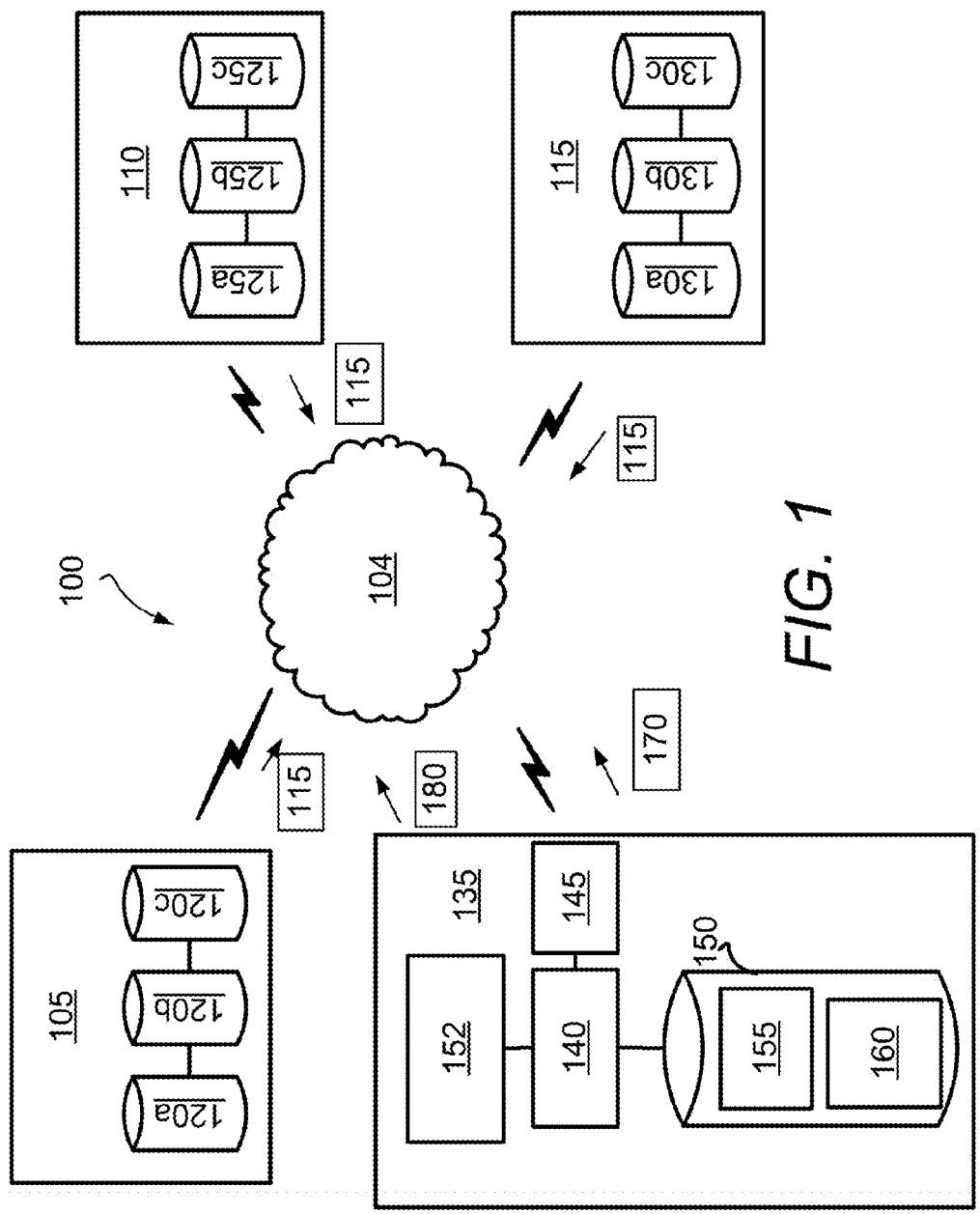

FIG. 1 illustrates a schematic diagram depicting a system that facilitates assigning and load balancing of rooms in a plurality of servers in a plurality of distribution groups in accordance with an illustrative embodiment of the present invention.

Figure 2:
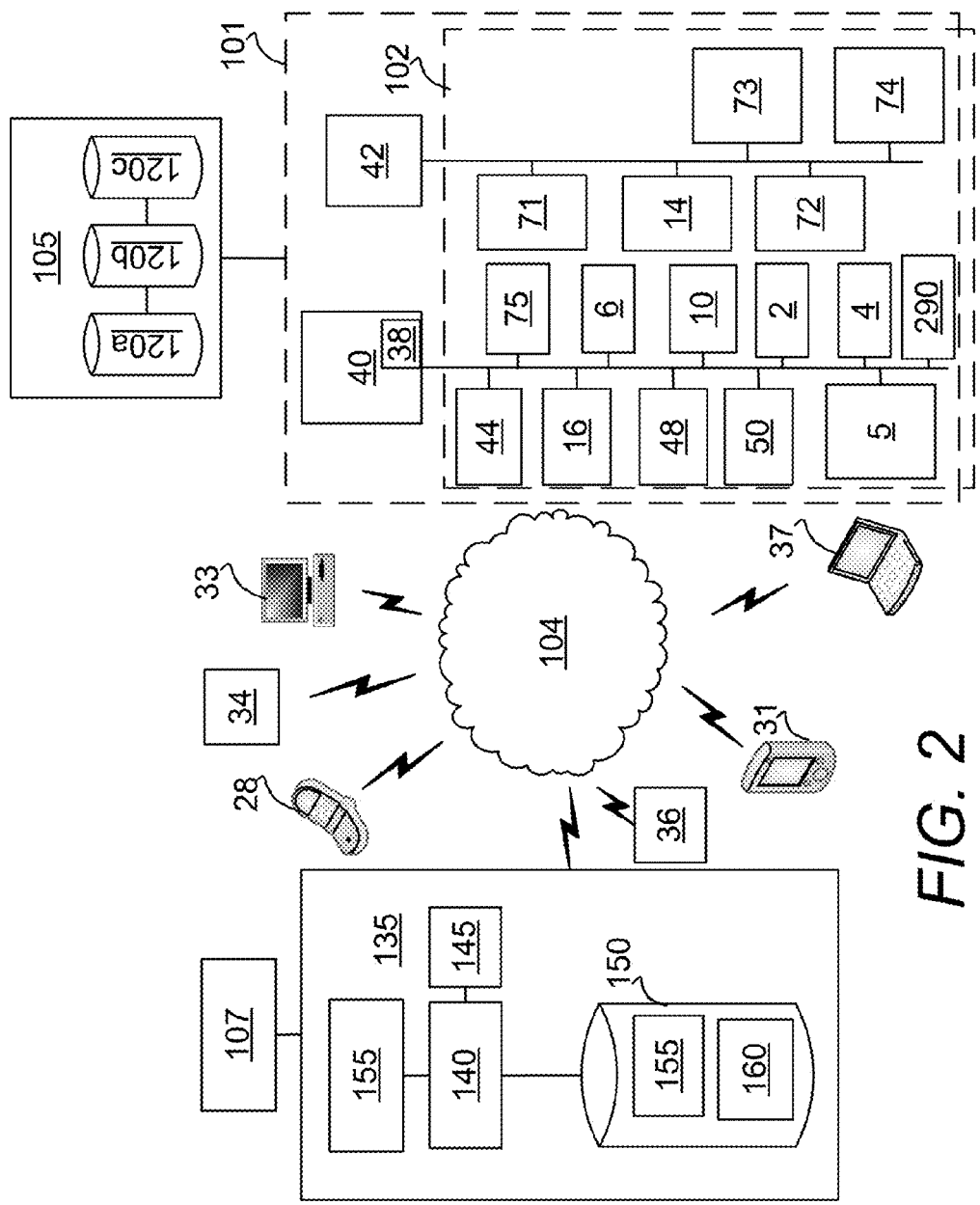

FIG. 2 illustrates a schematic diagram of a system that facilitates assigning and load balancing of rooms in a plurality of servers in a plurality of distribution groups in accordance with an illustrative embodiment of the present invention.

Figure 3:
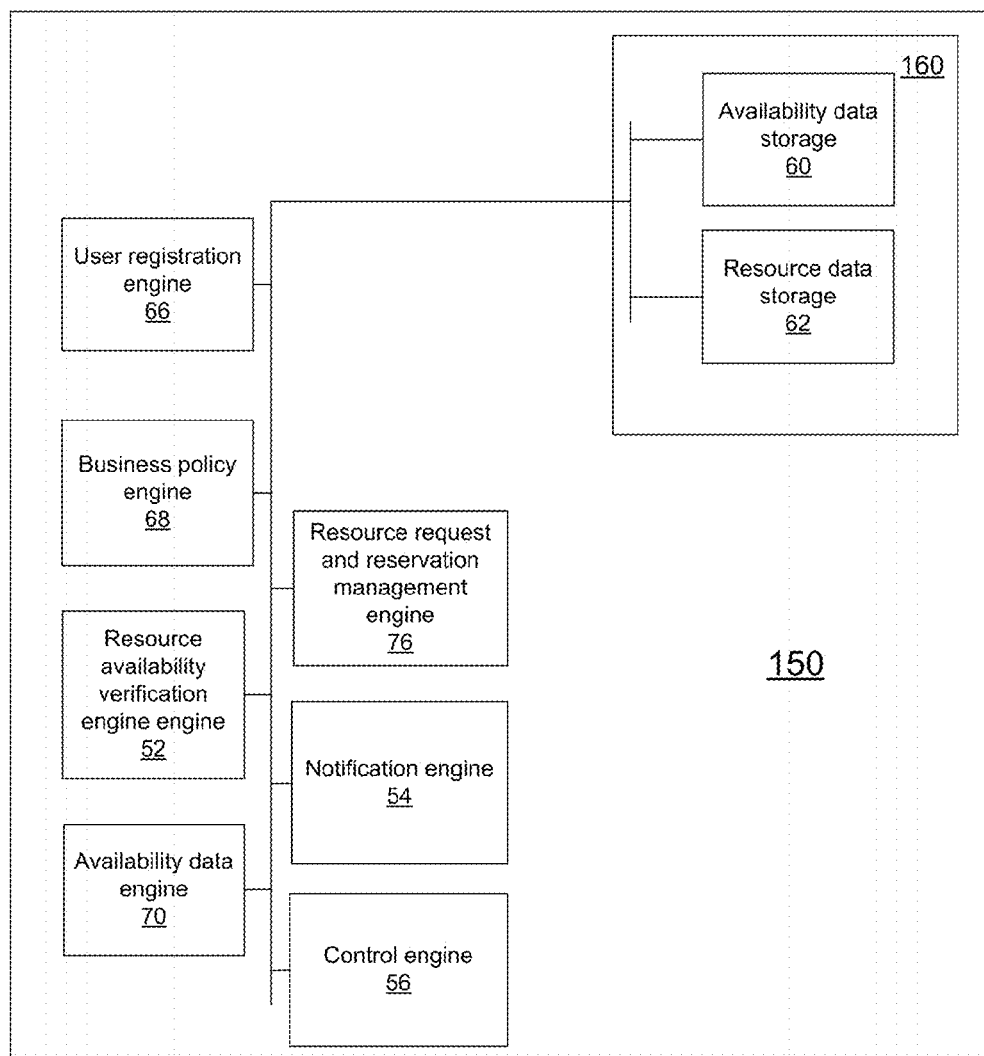

FIG. 3 illustrates a schematic diagram of a system that facilitates assigning and load balancing of rooms in a plurality of servers in a plurality of distribution groups in accordance with an illustrative embodiment of the present invention.

Figure 4:
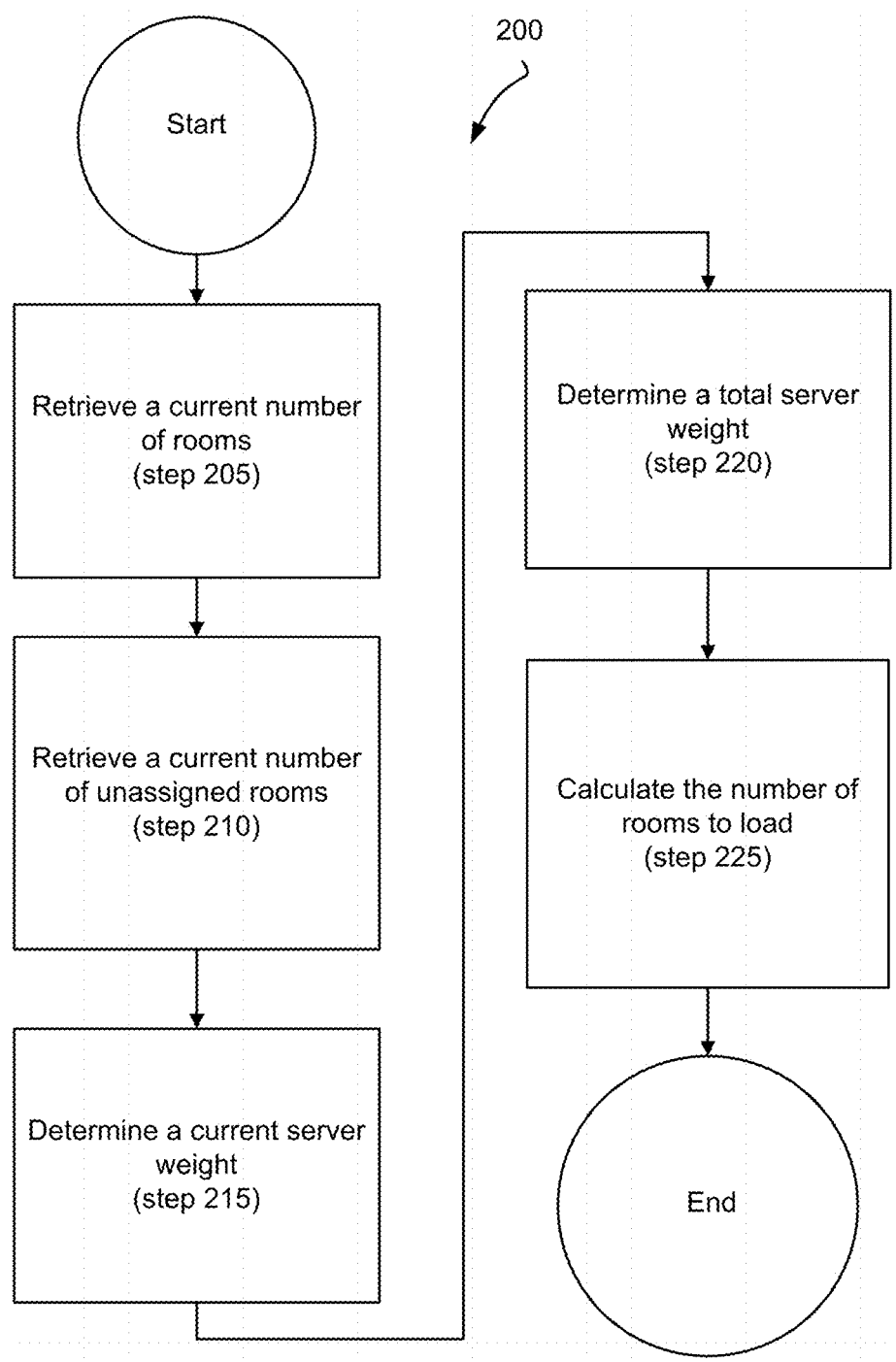

FIG. 4 illustrates a flowchart that facilitates assigning and load balancing rooms in a plurality of servers in a plurality of distribution groups in accordance with an illustrative embodiment of the present invention.

Figure 5:
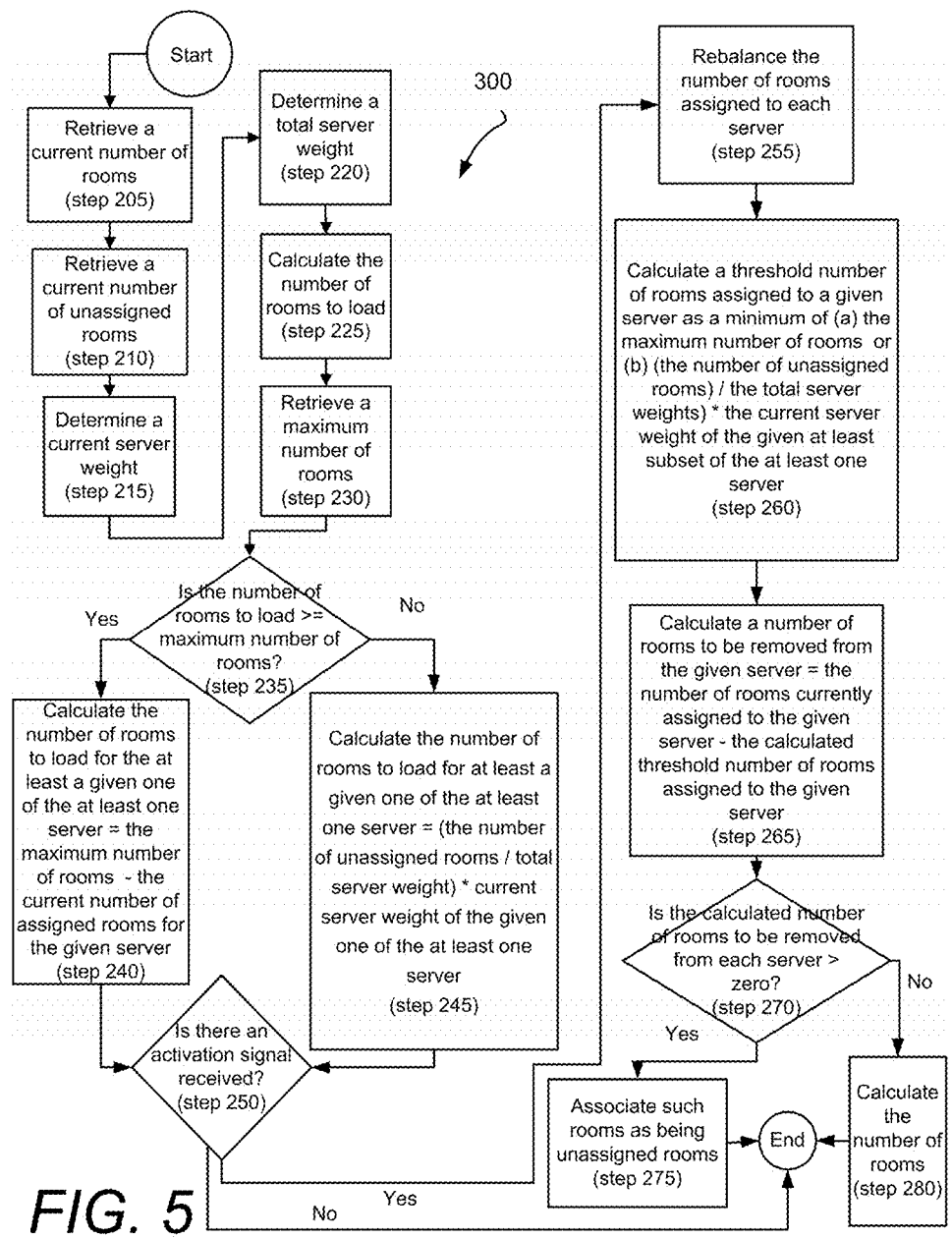

FIG. 5 illustrates a flowchart that facilitates assigning and load balancing of rooms in a plurality of servers in a plurality of distribution groups in accordance with another illustrative embodiment of the present invention.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

LIST OF REFERENCE NUMBERS FOR THE MAJOR ELEMENTS IN THE DRAWING

The following is a list of the major elements in the drawings in numerical order.
2 Cameras
4 VCRs
5 Local computers
6 DVDs/DVRs
10 CD players
14 Blindes/Shades
16 Projectors
28 Mobile telephones
31 Personal digital assistants
33 Computer systems
34 Video display/conferencing systems
36 Touch panels
37 Laptop computers
38 Network device
40 AV control system processor
42 Other system processor
44 Telephones
48 Projector screens
50 Televisions
52 Resource availability verification engine
54 Notification engine
56 Control engine
60 Availability data storage
62 Resource data storage
66 User registration engine
68 Business policy engine
70 Availability data engine
71 Lighting system devices
72 HVAC systems
73 Security systems
74 Sensors
75 Audios
76 Reservation management engine
100 System for assigning and rebalancing of servers
101 Conference room
102 Conference room devices
104 Network
105, 110, 115 Distribution group
107 Scheduling server
120a, 120b, 120c Servers
125a, 125b, 125c Servers
130a, 130b, 130c Servers
115 Acknowledgement signal
135 Computer or information handling system
140 Processor
145 Memory
150 Storage device
152 Communication interface
155 Software engine
160 Data storage area
170 Activation signal
180 Ping signal
205 Step of retrieving a current number of rooms
210 Step of retrieving a current number of unassigned rooms
215 Step of determining a current server weight
220 Step of determining a total server weight
225 Step of calculating the number of rooms to load
230 Step of retrieving a maximum number of rooms
235 Step of determining the number of rooms to load>=maximum number of rooms
240 Step of calculating the number of rooms to load
245 Step of calculating the number of rooms to load
250 Step of determining if the activation signal received
255 Step of rebalancing the number of rooms
260 Step of calculating a threshold number
265 Step of calculating a number of rooms to removed
270 Step of determining if the number of rooms removed>zero
275 Step of associating such rooms as being unassigned rooms
280 Step of calculating the number of rooms
290 Touch panels

DETAILED DESCRIPTION OF THE INVENTION

Mode(s) for Carrying Out the Invention

Disclosure of Invention

FIG. 1 is an exemplary embodiment of a system 100 for assigning and rebalancing of rooms in at least one server in at least one network distribution group. The system 100 includes a computer or information handling system 135. The computer or information handling system 135 includes one or more processors 140. One or more memory devices 145 are operably coupled with the one or more processors 140. In general operation, processor 140 and memory 145 cooperate to execute and store, respectively, one or more instructions of a program of instructions as well as perform other operations. As will be further explained below, the computer or information handling system 135 is configured to assign and rebalance servers 120a, 120b, 120c, 125a, 125b, 125c, 130a, 130b, 130c for each network distribution group 105, 110, 115.

Computer or information handling system 135 also includes one or more storage devices 150 operably coupled to processor 140. Storage device 150 includes one or more software engines 155 operable to enable the maintenance, management, scheduling, initiating, publication, presentation, provision, algorithmic calculation, and/or other data manipulation capability of resource availability and reservation information as well as to perform other operations. Depending upon implementation, various aspects of teachings of the present invention may be implemented in a single software engine 155, in a plurality of software engines 155, in one or more hardware components or in a combination of hardware and software systems.

In addition to one or more software engines 155, storage device 150 also includes one or more data storage areas 160.

Data storage area 160 is operably associated with the memory device 145 and processor 140. Data storage area 160 of storage device 150 may be leveraged to maintain data concerning the availability of one or more resources maintained for reservation, descriptive information concerning the one or more resources maintained for reservation, number of servers 120a, 120b, 120c, 125a, 125b, 125c, 130a, 130b, 130c and distribution groups 105, 110, 115, descriptive information of the servers 120a, 120b, 120c, 125a, 125b, 125c, 130a, 130b, 130c and network distribution, as well as other information pertinent to the management, maintenance, scheduling, initiating, publication, presentation, algorithmic calculation, and/or provision of resource availability and reservation information. Data storage area 160 may also include server weight, quantity of unassigned and assigned conference rooms for each of the distribution networks and server (active and stale servers) 120a, 120b, 120c, 125a, 125b, 125c, 130a, 130b, 130c and various algorithms such as the ones associated with the loading and rebalancing of servers 120a, 120b, 120c, 125a, 125b, 125c, 130a, 130b, 130c. Data storage area 160, or portions thereof, may also be utilized to store myriad other data.

Depending upon implementation, data storage device 150 may be implemented within computer or information handling system 135, in a storage area network operably coupled to a computer or information handling system 135, and/or in other storage media, including removable media, compatible with and accessible by computer or information handling system 135. In one embodiment, the one or more software engines 155, data storage areas 160, and processor 140 cooperate in the maintenance, management, scheduling, initiating, publication, presentation, calculation, provision and/or other manipulation of resource availability and reservation information, according to teachings of the present invention.

Computer or information handling system 135 also includes one or more communication interfaces 152. Communication interface 152 is operable to communicatively couple to computer or information handling system 135 with one or more user communication devices 28, 31, 33, 34, 36, 37 via one or more communication networks 104. Communication interface 152 is operably associated with the processor 140 and memory 145. Communication network 104 may be a personal area network, local area network, metropolitan area network, wide area network, an alternate network configuration or some combination of network types and/or topologies.

Communication interface 152 enables communications with a plurality of user communication devices 28, 31, 33, 34, 36, 37 via communication network 104. User communication devices 28, 31, 33, 34, 36, 37, which may be leveraged in accordance with teachings of the present invention include, without limitation, mobile telephones 28, personal digital assistants 31, computer systems 33, video display/conferencing systems 34, touch panels 36, laptop computers 37 as well as other communication enabled devices.

Communication network 104 may include one or more gateway devices (not expressly shown). User communication devices 28, 31, 33, 34, 36, 37 communicate with the gateway devices of communication network 104 just as computer or information handling system 135 communicates with the gateway devices. In this manner, user communication devices 28, 31, 33, 34, 36, 37 may be in selective communication with the computer or information handling system 135, the gateway devices, and communication network 104.

The gateway devices of communication network 104 preferably provide user communication devices 28, 31, 33, 34, 36, 37 and computer or information handling system 135 with an entrance to communication network 104 and may include software and/or hardware components to manage traffic entering and exiting communication network 104 and conversion between the communication protocols used by user communication devices 28, 31, 33, 34, 36, 37, computer or information handling system 135, and communication network 104. In certain embodiments, the gateway devices of communication network 104 may function as a proxy server and a firewall server for user communication devices 28, 31, 33, 34, 36, 37 as well as computer or information handling system 135. Further, the gateway devices may be associated with a router (not expressly shown) operable to direct a given packet of data that arrives at a gateway and a switch (not expressly shown) operable to provide a communication path into and out of each gateway device.

In one embodiment, communication network 104 may be a public switched telephone network (PSTN). In alternate embodiments, communication network 104 may include a cable telephony network, an IP (Internet Protocol) telephony network, a wireless network, a hybrid Cable/PSTN network, a hybrid IP/PSTN network, a hybrid wireless/PSTN network or any other suitable communication network or combination of communication networks. In addition, other network embodiments can be deployed with many variations in the number and type of devices, communication networks, the communication protocols, system topologies, and myriad other details without departing from the spirit and scope of the present invention.

In one embodiment, user communication devices 28, 31, 33, 34, 36, 37 may include a variety of forms of equipment connected to communication network 104 and accessible to a user. User communication devices 28, 31, 33, 34, 36, 37 may be, employ or include telephones (wireline or wireless), dial-up modems, cable modems, DSL (Digital Subscriber Line) modems, phone sets, fax equipment, answering machines, set-top boxes, televisions, POS (Point-of-Sale) equipment, PBX (private branch exchange) systems, personal computers, laptop computers, personal digital assistants (PDAs), other nascent technologies, or any other appropriate type or combination of communication equipment available to a user. User communication devices 28, 31, 33, 34, 36, 37 may be equipped for connectivity to communication network via a PSTN, DSLs, cable network, wireless network, or other communication channel.

The computer or information handling system 135 is in communication with network distribution group 105, 110, 115 via the network 104. Each distribution group 105, 110, 115 includes a number of servers 120a, 120b, 120c, 125a, 125b, 125c, 130a, 130b, 130c that are coupled to each other. Network servers 120a, 120b, 120c, 125a, 125b, 125c, 130a, 130b, 130c may be configured with additional processing, memory and storage capacity (not shown) to handle the load of servicing clients. The distribution group 105, 110, 115 may be separated based on geographical location. For example, network distribution group 105 that has servers 120a, 120b, 120c may be utilized to process requests and deliver data to clients located in North America. Likewise distribution 110 and 115 may handle clients located in Europe and Asia, respectively. Each distribution group 105, 110, 115 is responsible for the management of a set of conference rooms 101 and conference room devices 102.

Referring to FIG. 2, a distribution group 105 is coupled to a set of conference rooms 101. An AV control system processor 40 is connected to various conference room devices 102 via a wire line or wireless connection. The conference room devices 102 include various types of audio/visual equipment. For example, audio/visual equipment includes, but is not limited to, cameras 2, VCR 4, audio system devices 265, DVD/DVR 6, telephones 44, projectors 16 and projector screens 48, CD players 10, touch panels 290, one or more local computers 5, cable television boxes (not shown), and televisions 50 such as plasma, liquid crystal displays, light-emitting diode flat panels, and cathode ray tube televisions.

The AV control system processor 40 may be a Crestron 2-Series Control system available from Crestron Electronics, Inc. of Rockleigh, N.J. Every audio, video, and environmental element of the conference room 101 becomes integrated and accessible through the AV system processor 40.

Control system processor 42 is used control various devices, for example, security devices 73 (e.g., door locks), lighting system devices 71, blinds/drapes 14, Heating, Ventilating, and Air Conditioning (HVAC) system devices 72, and sensors 74 such as motion sensors.

The AV control system processor 40 and/or control system processor 42 may include a network device 38 for communication purposes via the network 104.

The computer or information handling system 135 communicates with a scheduling server 107 to upload and/or download one or more aspects of availability data associated with a resource to be maintained for reservation. For example, a user may upload or download information concerning one or more resources from or to one or more applications maintained by the user on a local computer, personal digital assistant, or other information handling system as well from a user maintained network site such as a web-based calendaring application or other content site. Examples of applications or utilities from which information may be uploaded or to which information may be downloaded another, including without limitation, Microsoft Outlook®, Yahoo! Calendar®, Lotus Notes®, as well as other calendaring applications.

Referring to FIG. 3, one embodiment of a collection of software engines 155 and data storage areas 160 is shown according to teachings of the present invention. As mentioned above, the number of software engines 155 and data storage areas 160 may be varied and, as such, the specific arrangement discussed herein is presented primarily for descriptive purposes. Data storage area 160 of data storage device 150 may include one or more resource availability data storage areas 60. Resource availability data storage area 60 includes data pertaining to conference rooms and locations, times, dates or other information concerning when a resource may be reserved. In one embodiment, resource availability data storage area 60 may cooperate with other data maintained in one or more data storage areas 160 as well as one or more software engines 155. Data storage area 160 also includes one or more resource data storage areas 62.

Resource data storage area 62 is operable to maintain data concerning one or more aspects of information regarding a resource maintained for reservation. In addition, data storage area 62 also includes business policy as it relates to the loading and rebalancing of servers 120*a*, 120*b*, 120*c*, 125*a*, 125*b*, 125*c*, 130*a*, 130*b*, 130*c* among distribution groups 105, 110, 115. Business policy, for example, may include an optimal time to load and rebalance servers 120*a*, 120*b*, 120*c*, 125*a*, 125*b*, 125*c*, 130*a*, 130*b*, 130*c*. A challenge that faces network solutions that is unique to the management of conference rooms is that the loading and rebalancing of conference room information cannot occur at a peak server utilization time because these servers cannot be shut down. The loading and rebalancing of rooms need to occur at the right time, which may mean when the server is at low utilization such as a Sunday at midnight. Data storage area 62 also includes various devices associated with a given conference room 101. For example, devices include video projectors 16, CD players 10, touch panels 290, audios 75, cameras 7, DVD/DVR players 6, VCRs 4, lighting system devices 71, touch panels 290, blinds/shades 14, HVAC systems 72, security systems 73, sensor systems 74, and local computers 5. Additional information may be maintained in resource data storage area 62 without departing from the spirit and scope of teachings of the present disclosure.

Teachings of the present invention may be implemented or effected using a variety of components and/or techniques. In an exemplary embodiment of the present invention, one or more software engines 155 may be leveraged in the maintenance, management, scheduling, loading and rebalancing initiating, publication, presentation and/or provision of resources availability and reservation system. As such, according to teachings of the present invention, one or more software engines 155 preferably associated with a computer or information handling system 135 cooperate to achieve and effect teachings discussed herein.

As further illustrated in FIG. 3, an embodiment of the present invention may include user registration engine 66. User registration engine 66 requires or requests a variety of data from a user during a registration process. For example, requests for data may include the user's name and password for registration purposes. In addition to performing such conventional user registration tasks as requiring or requesting a user to create a user name and/or password, an embodiment of user registration engine 66 employed by computer or information handling system 135 preferably requires or requests a registering resource provider to submit availability data as to one or more resources (e.g., one of the conference room devices 102) the resource provider desires to maintain for reservation. Further, user registration engine 66 may request or require that a resource provider set desired access rights for resource requesters seeking to view the resources maintained for reservation by the resource provider.

Various other data may be gathered from a registering user by a user registration engine 66 incorporating teachings of the present invention. It should be noted that user registration engine 66 may leverage one or more additional software engines 155 in the performance of the operations.

In addition to user registration engine 66, an embodiment of a system, method and software incorporating teachings of the present invention also includes a business policy engine 68. As discussed above, business policy engine 68 relates to the loading and rebalancing of servers 120*a*, 120*b*, 120*c*, 125*a*, 125*b*, 125*c*, 130*a*, 130*b*, 130*c* in at least two distribution groups 105, 110, 115. For example, upon user activation, the computer or information handling system 135 transmits an activation signal 170 to the servers 120*a*, 120*b*, 120*c*, 125*a*, 125*b*, 125*c*, 130*a*, 130*b*, 130*c* to perform the loading and rebalancing of servers. The business policy engine 68 operates with an availability data engine 70 as well as other software engines 155, to determine a conference room 101 that has the required conference room resources. The availability data engine 70 also includes a synchronization function that enable users to maintain coherency between a portable or local calendaring utility or application and a publicly accessible resource availability and reservation system. Synchronization capabilities also include functionality operable to resolve conflicts between a user's calendaring utility and availability scheduling maintained by the resource availability and reservation system.

The software engine 155 also includes a resource request and reservation management engine 76. In one embodiment, the resource request and reservation management engine 76 is employed to monitor and ensure compliance with reservation criteria established by the providers of the resources available for reservation. Further, resource request and reservation management engine 76 may be employed to monitor and ensure compliance with one or more reservation linking requirements requested by a provider of one or more resources available for reservation. In addition, resource request and reservation management engine 76 may, such as through cooperation with notification engine 54, be operable to notify a resource provider of a resource reservation request, to notify a resource requester as to the status of a reservation request for a selected resource, generate one or more meeting requests or reminders indicative of the resource reservation, as well as perform other tasks.

The resource availability verification engine 52 may also be included in an embodiment of the present invention. In one aspect, resource availability verification engine 52 may be used to perform one or more checks on resources maintained for reservation to ensure that postings regarding such resources accurately reflect substantially current or up-to-date availability. In another aspect, resource availability verification engine 52 may, upon receipt of a resource reservation request, verify that a selected resource remains available and has not been reserved in the interim period between a posting of the selected resource's reservation availability and the time when a user makes or initiates a reservation request process. Other operations and benefits may flow from a resource availability verification engine incorporating teachings of the present invention.

In addition to or in lieu of one or more software engines 155 discussed above, notification engine 54 may also be included in an exemplary embodiment of the present invention. Notification engine 54, according to teachings of the present invention, may be employed to provide real-time status information of resources in each conference room 101 including the preset resources 135 such as environmental resources and conference room devices 102. The preset resources 135 are further described in U.S. patent application Ser. No. 13/097,276, entitled "Meeting Management System Including Automated Equipment" (by inventors Adam Hanson, Ara Seferian, and Toine Leerentveld), which are incorporated herein by reference in their entirety as if fully set forth herein. The notification engine 54 may notify a resource requester or other people such as IT specialist as to the status of the submitted reservation requests and/or acknowledged reservations.

The software engines 155 also include a control engine 56. The control engine 56 operates in conjunction with the business policy engine 68 and other software engines 155 to load and rebalance the servers 120a, 120b, 120c, 125a, 125b, 125c, 130a, 130b, 130c. The control engine 56 may be leveraged in association with one or more included software engines 155 and data available in data storage area 160 to send a ping signal 180 to at least one server 120a, 120b, 120c, 125a, 125b, 125c, 130a, 130b, 130c to assist in determining the internet connectivity between the computer or information handling system 135 and the server 120a, 120b, 120c, 125a, 125b, 125c, 130a, 130c. The ping signal 180 may be transmitted repeatedly, possibly at a regular interval such as every 2 seconds. The ping signal 180 may be transmitted wired or wirelessly to the server 120a, 120b, 120c, 125a, 125b, 125c, 130a, 130c. In response to receiving the ping signal 180, the server 120a, 120b, 120c, 125a, 125b, 125c, 130a, 130c may transmit back to the computer or information handling system 135 an acknowledgment signal 175, which indicates internet connectivity. If the server 120a, 120b, 120c, 125a, 125b, 125c, 130a, 130b, 130c sends an acknowledgment signal 175 within a predetermined time (e.g., thirty minutes), the server 120a, 120b, 120c, 125a, 125b, 125c, 130a, 130b, 130c is considered an "active" server. In contrast, if the server 120a, 120b, 120c, 125a, 125b, 125c, 130a, 130b, 130c does not transmit the acknowledgment signal 175 after a predetermined time, the server 120a, 120b, 120c, 125a, 125b, 125c, 130a, 130b, 130c is considered a "stale" server.

The control engine 56 of the computer or information handling system 135 is further configured to gather or load information for a given distribution group 105, 110, 115. In one embodiment, the loading of the distribution group 105, 110, 115 is initiated by a technician. The technician may initiate the process after an installation of a new server 120a, 120b, 120c, 125a, 125b, 125c, 130a, 130b, 130c to a distribution group 105, 110, 115, when a server 120a, 120b, 120c, 125a, 125b, 125c, 130a, 130b, 130c becomes unavailable (e.g., stale server) for various reasons such as technical malfunction, and/or at other times that the technician wants to redistribute the loads between servers 120a, 120b, 120c, 125a, 125b, 125c, 130a, 130b, 130c. The loading process is handled by the computer or information handling system 135. The loading process includes the gathering of information for the distribution group 105, 110, 115, accumulating server weight, and calculating the number of rooms to load.

Gathering of Information for the Distribution

The gathering of information for the distribution group involves:

1. Retrieving the collection of active servers and the weight value associated with each server;
2. Retrieving the Maximum Number of Rooms per Server. This value is configurable by the technician;
3. Retrieving the distribution groups' number of rooms;
4. Retrieving the current number of rooms assigned to the server; and
5. Retrieving the current Number of Unassigned Rooms for the Distribution Group.

Accumulating Server Weight

The computer or information handling system 135 accumulates server weight includes as follows:

1. On startup, accumulate the active server weights for the distribution group. The server weight is a configurable value that a technician assigns to the server based on, for example, the server's capacity.
2. If the startup completes, accumulate the non-stale, active server weights for the distribution group.

Calculating the Number of Rooms to Load

The computer or information handling system 135 calculates the number of rooms to load as follows:

> Rooms to Load=(Number of Rooms for Group/Total Server weights)*current Server weight(to the next largest integer).

When the process is executing startup (boot-up), the total server weight includes the active and stale server weights. The information handling system 135 does not distinguish a difference between an active or stale server 120a, 120b, 120c, 125a, 125b, 125c, 130a, 130b, 130c. However, at other times, the total server weight includes the active non-stale servers.

> If the(Number of Rooms to Load>=Maximum Number of Rooms per Server)then(the Number of Rooms to Load=Maximum Number of Rooms per Server–current Number of Assigned Rooms per Server).

The following is a pseudo-code representation of the mark rooms for loading operation in accordance with an illustrative embodiment of the present invention.

```
1. ServerStalePeriod = GetServerStalePeriod( );
2. GetServerInfo (DistributionGroupServers,
NumberofRoomsInDistributionGroup, RoomsAssignedToServer,
UnassignedRoomsForGroup, MaximumNumberofRoomsPerServer);
3. If (UnassignedRoomsForGroup == 0)
{
Sleep (2 minutes)
Go to Step 1
}
4. For each (Server in DistributionGroupServers)
{
If (Server == Active)
{
If (ServiceStarting)
    TotalServerWeights = TotalServerWeights + ServerWeight;
Else if (Server <> Stale)
    TotalServerWeights = TotalServerWeights + ServerWeight;
If (Server == thisServer)
    CurrentServerWeight = ServerWeight;
}
}
5. NumberofRoomsToLoad = (NumberofRoomsInDistributionGroup /
TotalServerWeights) * CurrentServerWeight;
6. If (NumberofRoomsToLoad >= MaximumNumberofRoomsPerServer)
NumberofRoomsToLoad = MaximumNumberoRoomsPerServer –
RoomsAssignedToServer;
7. Sleep (2 minutes)
8. Go to Step 1
```

In certain situation, the servers 120a, 120b, 120c, 125a, 125b, 125c, 130a, 130b, 130c within the network distribution need load rebalancing. The rebalancing of the servers 120a, 120b, 120c, 125a, 125b, 125c, 130a, 130b, 130c in the distribution group 105, 110, 115 is used when it becomes necessary to equalize the number of rooms over all the servers 120a, 120b, 120c, 125a, 125b, 125c, 130a, 130b, 130c in a distribution group 105, 110, 115 such as when a new server 120a, 120b, 120c, 125a, 125b, 125c, 130a, 130b, 130c is added to the distribution group 105, 110, 115 or a server 120a, 120b, 120c, 125a, 125b, 125c, 130a, 130b, 130c is coming back online after an outage. The rebalance function is a manual process that is initiated by a technician activating the information handling system 135 to transmit an activation signal 170. However, in another embodiment, the information handling system 135 transmits the activation signal 170 automatically based on the business policy engine 68. The business policy may be to perform rebalancing when the servers 120a, 120b, 120c, 125a, 125b, 125c, 130a, 130b, 130c are at a low utilization rate. The process of rebalancing starts with the same process as discussed above for loading. The computer or information handling system 135 then performs on each server 120a, 120b, 120c, 125a, 125b, 125c, 130a, 130b, 130c in the distribution group 105, 110, 115 calculating the number of rooms a given server should have 120a, 120b, 120c, 125a, 125b, 125c, 130a, 130b, 130c. The number of rooms to shed=number of rooms assigned to server−minimum value of:

max rooms per server

—or—

(distribution groups' number of rooms/total server weights)*current server weight If the Number of Rooms to Shed >0 then the information handling system 135 performs the following operations on the servers:

1. Unmark these rooms, which will return them to the pool of unassigned rooms for the distribution group; and 2. Enter a "wait state" so that the other servers in the distribution group will have an opportunity to load the unmarked rooms (e.g. using Mark Rooms for loading process as described above).

The following is a pseudo-code representation of the mark rooms for loading operation in accordance with an illustrative embodiment of the present invention.

```
1. ServerStalePeriod = GetServerStalePeriod( );
2. GetServerInfo (DistributionGroupServers,
NumberofRoomsInDistributionGroup, RoomsAssignedToServer,
UnassignedRoomsForGroup, MaximumNumberofRoomsPerServer);
3. Foreach (Server in DistributionGroupServers)
{
If (Server == Active)
{
If (ServiceStarting)
    TotalServerWeights = TotalServerWeights + ServerWeight;
Else if (Server <> Stale)
    TotalServerWeights = TotalServerWeights + ServerWeight;
If (Server == thisServer)
    CurrentServerWeight = ServerWeight;
}
}
4. NumberOfRoomsToShed = RoomsAssignedToServer –
Min(MaxRoomsPerServer, (NumberofRoomsInDistributionGroup /
TotalServerWeights) * CurrentServerWeight);
5. If (NumberOfRoomsToShed > 0)
{
UnmarkRooms(NumberOfRoomsToShed);
Sleep (ServerStalePeriod);
}
```

FIG. 4 is flow chart 200 illustrating the loading of information and rebalancing of servers by the computer or information handling system 135. The computer or information handling system 135 retrieves a current number of rooms assigned to each server 120a, 120b, 120c, 125a, 125b, 125c, 130a, 130c in step 205. In step 210, the information handling system 135 retrieves a current number of unassigned rooms from each of the distribution group 105, 110, 115 in step 205. An unassigned room is a room that has not been allocated to any server 120a, 120b, 120c, 125a, 125b, 125c, 130a, 130b, 130c. As such, none of the servers 120a, 120b, 120c, 125a, 125b, 125c, 130a, 130b, 130c are responsible for managing the unassigned room 101 and the conference room devices 102 associated with the unassigned room 101.

In step 215, the information handling system 135 determines a current server weight for each subset of the at least one server 120a, 120b, 120c, 125a, 125b, 125c, 130a, 130c. The current server weight is a configurable value that is assigned to each server 120a, 120b, 120c, 125a, 125b, 125c, 130a, 130c by a technician based on the server capability. The server weight, for example, may range from 1 to 10 with a 1 having a low capacity and a 10 having the highest capacity.

The information handling system 135 in step 220 determines a total server weight. In step 225, the information handling system 135 calculates the number of rooms 101 to load for at least a given one of the at least one server 120a, 120b, 120c, 125a, 125b, 125c, 130a, 130c based at least in part on the number of unassigned rooms, total server weight, and current server weight of the given one of the at least one server 120a, 120b, 120c, 125a, 125b, 125c, 130a, 130c.

FIG. 5 illustrates flowchart 300 that facilitates assigning and load balancing a plurality of servers 120a, 120b, 120c, 125a, 125b, 125c, 130a, 130b, 130c in a plurality of distribution groups 105, 110, 115 in accordance with another illustrative embodiment of the present invention. FIG. 5 is similar to FIG. 4 with respect to steps 205, 210, 215, 220, and 225. FIG. 5 continues with step 230, in which, the information handling system 135 retrieves a maximum number of rooms and determines (in step 235) if the calculated number of rooms to load for a given server 120a, 120b, 120c, 125a, 125b, 125c, 130a, 130b, 130c is greater than or equal to the maximum number of rooms. If the calculated number of rooms to load for a given server 120a, 120b, 120c, 125a, 125b, 125c, 130a, 130b, 130c is greater than or equal to the maximum then calculating (in step 240) the number of rooms to load for the given server 120a, 120b, 120c, 125a, 125b, 125c, 130a, 130b, 130c is the difference between the maximum number of rooms and the current number of assigned rooms for the given server 120a, 120b, 120c, 125a, 125b, 125c, 130a, 130b, 130c.

However, if the calculated number of rooms to load for a given server 120a, 120b, 120c, 125a, 125b, 125c, 130a, 130b, 130c is not greater than or equal to the maximum, then calculating (in step 245) the number of rooms to load for at least a given one of the at least one server 120a, 120b, 120c, 125a, 125b, 125c, 130a, 130b, 130c is equal to the number of unassigned rooms divided by the total server weight times the current server weight of the given one of the at least one server 120a, 120b, 120c, 125a, 125b, 125c, 130a, 130b, 130c.

The information handling system 135 determines (in step 250) if the given one of the at least one server 120a, 120b, 120c, 125a, 125b, 125c, 130a, 130b, 130c receives an activation signal generated by a scheduler system. If the given server 120a, 120b, 120c, 125a, 125b, 125c, 130a, 130b, 130c did not receive an activation signal, the process ends or goes back to step 250 to monitor for the activation signal. However, if the server 120a, 120b, 120c, 125a, 125b, 125c, 130a, 130b, 130c receives the activation signal, the flowchart 300 continues to step 255 in which the information handling system 135 rebalances the number of rooms assigned to each server 120a, 120b, 120c, 125a, 125b, 125c, 130a, 130b, 130c for each distribution group 105, 110, 115. The rebalancing process comprises, in step 260, calculating a threshold number of rooms assigned to a given server 120a, 120b, 120c, 125a, 125b, 125c, 130a, 130b, 130c as a minimum of: (a) the maximum number of rooms or (b) the number of unassigned rooms divided by the total server weights and multiplied by the current server weight of the given at least subset of the at least one server 120a, 120b, 120c, 125a, 125b, 125c, 130a, 130b, 130c.

In step 265, the information handling system 135 calculates a number of rooms to be removed from the given server 120a, 120b, 120c, 125a, 125b, 125c, 130a, 130b, 130c is based on a difference of the number of rooms currently assigned to the given server 120a, 120b, 120c, 125a, 125b, 125c, 130a, 130b, 130c and the calculated threshold number of rooms assigned to the given server 120a, 120b, 120c, 125a, 125b, 125c, 130a, 130b, 130c. In step 270, the information handling system 135 determines if the calculated number of rooms to be removed from each server 120a, 120b, 120c, 125a, 125b, 125c, 130a, 130b, 130c is greater than zero. If the calculated number of rooms is greater than zero, in step 275, the information handling system 135 associates such rooms as being unassigned rooms when calculating the number of rooms to load. However, if the calculated number of rooms is less than or equal to zero, in step 280, the information handling system 135 calculates the number of rooms to be removed from the given server 120a, 120b, 120c, 125a, 125b, 125c, 130a, 130b, 130c is based on a difference of the number of rooms currently assigned to the given server 120a, 120b, 120c, 125a, 125b, 125c, 130a, 130b, 130c and the calculated threshold number of rooms assigned to the given server 120a, 120b, 120c, 125a, 125b, 125c, 130a, 130b, 130c.

A number of software engines 20 are discussed in reference to FIG. 2. Such discussion is exemplary and not intended to be an exhaustive listing of potentially useful capabilities. For example, other engines may provide software and firmware updates, database wide searching, pop-up, voice, and phone calls. One or more of the software engines discussed above may be combined or divided and additional software engines 20 may be included in an implementation of the present invention. Further, the discussion of FIG. 4 through FIG. 5 may suggest a variety of additional software engines 20 contemplated by the present invention.

The present invention may be described herein in terms of block diagrams, screen shots and flowcharts, optional selections and various processing steps. Such functional blocks may be realized by any number of hardware and/or software components configured to perform to specified functions. For example, the present invention may employ various integrated circuit components (e.g., memory elements, processing elements, logic elements, look-up tables, and the like), which may carry out a variety of functions under the control of one or more microprocessors or other control devices. Similarly, the software elements of the present invention may be implemented with any programming or scripting language such as C, C++, Java, COBOL, assembler, PERL, Delphi, extensible markup language (XML), smart card technologies with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used with a client-side scripting language, such as JavaScript, VBScript or the like.

The various system components may be independently, separately or collectively suitably coupled to the network via data links which include, for example, a connection to an Internet Service Provider (ISP) over the local loop as is typically used in connection with a standard modem communication, cable modem, Dish network, ISDN, Digital Subscriber Line (DSL), or various wireless communication methods.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the logic for managing file system objects across multiple volumes is implemented as a set of computer program instructions that is converted into a computer executable form, stored as such in a computer readable medium, and executed by a microprocessor within the cluster node under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

INDUSTRIAL APPLICABILITY

To solve the aforementioned problems, the present invention is methods, systems, and software for assigning and load balancing of servers in a distribution network.

LIST OF ACRONYMS USED IN THE DETAILED DESCRIPTION OF THE INVENTION

The following is a list of the acronyms used in the specification in alphabetical order.
AV Audio Visual
CAD Computer Aided Design
CD Compact Disc
DSL Digital Subscriber Line
DVD Digital Video Disc or Digital Versatile Disc
DVR Digital Video Recorder
FPGA Field Programmable Gate Array
HVAC Heating, Ventilating, and Air Conditioning
IP Internet Protocol
ISP Internet Service Provider
IT Information Technology
PC Personal Computer
PDA Personal Digital Assistant
PDX Private Branch Exchange
PLD Programmable Logic Device
POS Point-of-Sale
PSTN Public Switched Telephone Network
RAM Random Access Memory
ROM Read Only Memory
TV Television
VCR Videocassette Recorder Alternate Embodiments Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

For example, any of the flow diagrams described herein may be modified or arranged in any manner to support operation in various configurations. The flow diagrams may include more or fewer blocks, combined or separated blocks, alternative flow arrangements, or the like. The flow diagrams may also be implemented in the form of hardware, firmware, or software. If implemented in software, the software may be written in any suitable code in accordance with the example embodiments herein or other embodiments. The software may be stored in any form of computer readable medium and loaded and executed by a general purpose or application specific processor suitable to perform the example embodiments described herein or other embodiments.

In another example, the information handling system may be incorporated into one of the distribution groups to produce a single system.

In yet another example, there may be a plurality of distributions, each distribution having a plurality of servers. The information handling system may load and rebalance the servers associated with at least one of the plurality of distributions.

What is claimed is:

1. A method of assigning and rebalancing of rooms having at least one server, the method comprising the steps of:
   (a) retrieving (205) a current number of rooms assigned to each server;
   (b) retrieving (210) a current number of unassigned rooms;
   (c) determining (215) a current server weight for each of at least a subset of the at least one server, the server weight is a configurable value that is assigned to the server based on the server's capacity such that each server has a server weight that ranges from lowest to highest capacity;
   (d) determining (220) a total server weight;
   (e) calculating (225) the number of rooms to load for at least a given one of the at least one server based at least in part on the number of unassigned rooms, total server weight, and current server weight of the given one of the at least one server; and (f) rebalancing (255) the number of rooms assigned to each server, if an activation signal is received, the rebalancing comprising:

(i) calculating (260) a threshold number of rooms assigned to a given server as a minimum of:

(a) the maximum number of rooms or (b) the number of unassigned rooms divided by the total server weights and multiplied by the current server weight of the given at least subset of the at least one server.

2. The method of claim 1, wherein the total server weight comprises the sum of the current server weights of the non-stale servers, the non-stale server being a server that transmits an acknowledgement signal in response to a ping signal.

3. The method of claim 2, wherein the total server weight further comprises the sum of the current server weights of the stale server, the stale server being a server that does not transmit the acknowledgement signal in response to the status signal.

4. The method of claim 1, wherein the current server weight is a configurable value that is based on the server system capability.

5. The method of claim 1, further comprising:

(a) retrieving (230) a maximum number of rooms;

(b) determining (235) if the calculated number of rooms to load for a given server is greater than or equal to the maximum number of rooms;

(c) if the calculated number of rooms to load for a given server is greater than or equal to the maximum then calculating (240) the number of rooms to load for the given server is the difference between the maximum number of rooms and the current number of assigned rooms for the given server; and (d) if the calculated number of rooms to load for a given server is not greater than or equal to the maximum then calculating (245) the number of rooms to load for at least a given one of the at least one server is equal to the number of unassigned rooms divided by the total server weight times the current server weight of the given one of the at least one server.

6. The method of claim 5, further comprising calculating (265) a number of rooms to be removed from the given server is based on a difference of the number of rooms currently assigned to the given server and the calculated threshold number of rooms assigned to the given server.

7. The method of claim 6, further comprising:

(a) determining (270) if the calculated number of rooms to be removed from each server is greater than zero;

(b) associating (275) such rooms as being unassigned rooms when calculating the number of rooms to load, if the calculated number of rooms to be removed is greater than zero; and (c) calculating (280) the number of rooms to be removed from the given server is based on a difference of the number of rooms currently assigned to the given server and the calculated threshold number of rooms assigned to the given server, if the calculated number of rooms to be removed is not greater than zero.

8. The method of claim 1, wherein rebalancing the number of rooms assigned to each server includes determining (250) if the given one of the at least one server receives an activation signal generated by an information handling system.

9. The method of claim 8, wherein the information handling system initiates the activation signal when all of the at least one server is at a low utilization rate.

10. The method of claim 9, wherein when the room is assigned to the given one of the at least one server, the given one of the at least one server is configured to schedule reservation and usage of the room and is further configured to manage at least one room device.

11. The method of claim 10, wherein the room device comprising at least one of a video projector, CD player, touch panel, audio system device, camera, DVD/DVR player, VCR, light system device, touch panel, blinds/shades, HVAC, security system device, sensor system device, and local computer.

12. A system (100), comprising:

(a) a distribution group (105, 110, 115) including at least one server (120*a*, 120*b*, 120*n*, 125*a*, 125*b*, 125*n*, 130*a*, 130*b*, 130*n*); and (b) an information handling system (135) in communications with the at least one server, comprising:

(i) at least one processor (140);

(ii) a memory (145) being operably associated with the at least one processor;

(iii) at least one storage device (150) being operably associated with the memory and the at least one processor, the data storage device includes a software engine (155) and data storage (160);

(iv) at least one communication interface (152) being operably associated with the at least one processor and memory, the at least one communication interface configured to enable communications between the information handling system and the at least a given one of the at least one server;

wherein the information handling system is configured to:

(i) retrieve a current number of rooms assigned to each server, (ii) retrieve a current number of unassigned rooms, (iii) determine a current server weight for each of at least a subset of the at least one server, the server weight is a configurable value that is assigned to the server based on the server's capacity such that each server has a server weight that ranges from lowest to highest capacity, (iv) determine a total server weight, (v) calculate the number of rooms to load for at least a given one of the at least one server based at least in part on the number of unassigned rooms, total server weight, and current server weight of the given one of the at least one server; and rebalance the number of rooms assigned to each server, the rebalancing comprising:

(i) calculate a threshold number of rooms assigned to a given server a minimum of:

(a) the maximum number of rooms or (b) the number of unassigned rooms divided by the total server weights and multiplied by the current server weight of the given at least subset of the at least one server.

13. The system of claim 12, wherein the total server weight comprises the sum of the current server weights of the non-stale servers, the non-stale server being a server that transmits an acknowledgement signal in response to ping signal from the information handling system.

14. The system of claim 13, wherein the total server weight further comprises the sum of the current server weights of the stale servers, the stale server being a server that does not transmit the acknowledgement signal in response to the ping signal from the information handling system.

15. The system of claim 12, wherein the current server weight is a configurable value that is based on the at least one server system capability.

16. The system of claim 12, wherein the information handling system is further configured to:
   (a) retrieve a maximum number of rooms;
   (b) determine if the calculated number of rooms to load for a given server is greater than or equal to the maximum number of rooms;
   (c) if the calculated number of rooms to load for a given server is greater than or equal to the maximum number of rooms, then calculate the number of rooms to load for the given server is the difference between the maximum number of rooms and the current number of assigned rooms for the given server; and
   (d) if the calculated number of rooms to load for a given server is not greater than or equal to the maximum then calculating the number of rooms to load for at least a given one of the at least one server is equal to the number of unassigned rooms divided by the total server weight times the current server weight of the given one of the at least one server.

17. The system of claim 16, wherein the information handling system is further configured to calculate a number of rooms to be removed from the given server is based on a difference of the number of rooms currently assigned to the given server and the calculated threshold number of rooms assigned to the given server.

18. The system of claim 17, wherein the information handling system is further configured to:
   (a) determine if the calculated number of rooms to be removed from each server is greater than zero;
   (b) associate such rooms as being unassigned rooms when calculating the number of rooms to load, if the calculated number of rooms to be removed from each server is greater than zero; and
   (c) calculate the number of rooms to be removed from the given server is based on a difference of the number of rooms currently assigned to the given server and the calculated threshold number of rooms assigned to the given server, if the calculated number of rooms to be removed is not greater than zero.

19. The system of claim 16, wherein rebalancing the number of rooms assigned to each server includes determining if the given one of the at least one server receives an activation signal (170) generated by an information handling system (135).

20. The system of claim 19, wherein the information handling system is configured to initiate the activation signal when at least one server is at a low utilization rate.

21. The system of claim 12, wherein when the room is assigned to the given one of the at least one server, the given one of the at least one server is configured to schedule reservation and usage of the room and is further configured to manage at least one room device.

22. The system of claim 21, wherein the room device comprising at least one of a video projector, CD player, touch panel, audio system device, camera, DVD/DVR player, VCR, light system device, touch panel, blinds/shades, HVAC, security system device, sensor system device, and local computer.

23. A computer program product for assigning and rebalancing of rooms having at least one server, the computer program product comprising: a computer readable storage medium having computer readable program code embodied therewith, the computer readable program code comprising: computer readable program code configured to:
   (a) retrieve a current number of rooms assigned to each server;
   (b) retrieve a current number of unassigned rooms;
   (c) determine a current server weight for each of at least a subset of the at least one server, the server weight is a configurable value that is assigned to the server based on the server's capacity such that each server has a server weight that ranges from lowest to highest capacity;
   (d) determine a total server weight;
   (e) calculate the number of rooms to load for at least a given one of the at least one server based at least in part on the number of unassigned rooms, total server weight, and current server weight of the given one of the at least one server; and
   (f) rebalance the number of rooms assigned to each server, the rebalancing comprising:
      (i) calculate a threshold number of rooms assigned to a given server as a minimum of:
         (a) the maximum number of rooms or
         (b) the number of unassigned rooms divided by the total server weights and multiplied by the current server weight of the given at least subset of the at least one server.

24. The computer program product of claim 23, wherein the total server weight comprises the sum of the current server weights of the non-stale servers, the non-stale server being a server that transmits an acknowledgement signal in response to ping signal from the information handling system.

25. The computer program product of claim 24, wherein the total server weight further comprises the sum of the current server weights of the stale servers, the stale server being a server that does not transmit the acknowledgement signal in response to the ping signal from the information handling system.

26. The computer program product of claim 23, wherein the current server weight is a configurable value that is based on the server system capability.

27. The computer program product of claim 23, further comprising:
   (a) retrieve a maximum number of rooms;
   (b) determine if the calculated number of rooms to load for a given server is greater than or equal to the maximum number of rooms;
   (c) if the calculated number of rooms to load for a given server is greater than or equal to the maximum then calculate the number of rooms to load for the given server is the difference between the maximum number of rooms and the current number of assigned rooms for the given server; and
   (d) if the calculated number of rooms to load for a given server is not greater than or equal to the maximum then calculate the number of rooms to load for at least a given one of the at least one server is equal to the number of unassigned rooms divided by the total server weight times the current server weight of the given one of the at least one server.

28. The computer program product of claim 27, further comprising calculate a number of rooms to be removed from the given server is based on a difference of the number of rooms currently assigned to the given server and the calculated threshold number of rooms assigned to the given server.

29. The computer program product of claim 28, further comprising:
   (a) determine if the calculated number of rooms to be removed from each server is greater than zero;

(b) associate such rooms as being unassigned rooms when calculating the number of rooms to load, if the calculated number of rooms to be removed is greater than zero; and (c) calculate the number of rooms to be removed from the given server is based on a difference of the number of rooms currently assigned to the given server and the calculated threshold number of rooms assigned to the given server, if the calculated number of rooms to be removed is not greater than zero.

30. The computer program product of claim 23, wherein rebalancing the number of rooms assigned to each server is in response to an activation signal generated by an information handling system.

31. The computer program product of claim 30, wherein the information handling system initiates the activation signal when all of the at least one server is at a low utilization rate.

32. The computer program product of claim 23, wherein when the room is assigned to the given one of the at least one server, the given one of the at least one server is configured to schedule reservation and usage of the room and is further configured to manage at least one room device.

33. The computer program product of claim 32, wherein the room device comprising at least one of a video projector, CD player, touch panel, audio system device, camera, DVD/DVR player, VCR, light system device, touch panel, blinds/shades, HVAC, security system device, sensor system device, and local computer.

\* \* \* \* \*